United States Patent [19]

Sugita

[11] Patent Number: 4,681,206

[45] Date of Patent: Jul. 21, 1987

[54] CURVILINEAR ESCALATOR

[75] Inventor: Kazuhiko Sugita, Inazawa, Japan

[73] Assignee: Mitsubishi Denki Kabushiki Kaisha, Tokyo, Japan

[21] Appl. No.: 763,893

[22] Filed: Aug. 9, 1985

Related U.S. Application Data

[63] Continuation of Ser. No. 580,957, Feb. 16, 1984, abandoned.

[30] Foreign Application Priority Data

Mar. 11, 1983 [JP] Japan ............................ 58-34941[U]

[51] Int. Cl.⁴ ........................ B66B 21/06; B65G 17/42

[52] U.S. Cl. .................................... 198/328; 198/852

[58] Field of Search ............... 198/328, 332, 852, 853, 198/326

[56] References Cited

U.S. PATENT DOCUMENTS

| | | | |
|---|---|---|---|
| 617,779 | 1/1899 | Seeberger | 198/328 |
| 727,720 | 5/1903 | Venn | 198/328 |
| 984,858 | 2/1911 | Seeberger | 198/328 |
| 1,130,555 | 3/1915 | Wheeler | 198/328 |
| 2,319,617 | 5/1943 | Manierre | 198/852 |
| 2,600,174 | 6/1952 | Sheehan | 198/852 |
| 2,641,351 | 6/1953 | Riley | 198/328 |
| 2,656,031 | 10/1953 | Masek | 198/332 |
| 2,823,785 | 2/1958 | Hefti | 198/328 |
| 3,515,253 | 6/1970 | Yamada | 198/328 |
| 3,878,931 | 4/1975 | Luna | 198/328 |
| 4,071,054 | 1/1978 | Santucci et al. | 198/852 |
| 4,399,909 | 8/1983 | Gorelik | 198/852 |

FOREIGN PATENT DOCUMENTS

| | | | |
|---|---|---|---|
| 551716 | 3/1929 | Fed. Rep. of Germany | 198/326 |
| 1135637 | 8/1962 | Fed. Rep. of Germany | 198/332 |
| 2830251 | 2/1979 | Fed. Rep. of Germany . | |
| 2252268 | 12/1974 | France . | |
| 48-25559 | 7/1973 | Japan | 198/328 |
| 52-25385 | 2/1977 | Japan | 198/852 |
| 54-132990 | 10/1979 | Japan | 198/326 |
| 2027658 | 2/1980 | United Kingdom | 198/852 |

*Primary Examiner*—Joseph E. Valenza
*Assistant Examiner*—Daniel R. Alexander
*Attorney, Agent, or Firm*—Oblon, Fisher, Spivak, McClelland & Maier

[57] ABSTRACT

A curvilinear escalator comprises, in combination: a main frame having an arcuate shape in the horizontal plane of projection and disposed in inclined condition, the main frame having a forwarding way formed on the top surface side thereof, a turning section at one distal end part of the main frame in the longitudinal direction thereof, and a return way on the bottom surface side thereof to thereby construct an endless conveying path; a plurality of steps continuously disposed in the conveying path and guided therealong, each of the steps being in a sector shape; a pair of step chains disposed at both sides of the steps on the edge part in the breadthwise direction thereof and provided along the conveying path, the each step chain being constructed with joint pieces, each of which is engaged with the end part of a step shaft disposed in each of the steps in the breadthwise direction thereof, and link members with one end part thereof being connected with one end part of the joint piece and to bring the adjacent pieces into mutually connected state; and a spherical joint interposed between the step shaft and the link member.

2 Claims, 6 Drawing Figures

CURVILINEAR ESCALATOR

This application is a continuation of application Ser. No. 580,957 filed Feb. 16, 1984, now abandoned.

BACKGROUND OF THE INVENTION

This invention relates to a curvilinear escalator or a curvilinear moving staircase having an arcuate conveying path in the horizontal plane of projection, and, more particularly, it is concerned with a step chain of such curvilinear escalator.

DESCRIPTION OF THE PRIOR ART

Japanese Patent Publication No. 48-25559, for example, discloses a curvilinear escalator of a construction, in which a main frame in an arcuate form in the horizontal plane of projection is provided in an inclined disposition, a forwarding way is disposed on the top surface side of this main frame, a turning section is provided at one distal end part of the main frame in the longitudinal direction thereof, and a return way is disposed on the bottom surface side of the main frame, thereby forming an endless conveying path. Then, a multitude of steps, each having a sector form in plane, are disposed continuously in the conveying path, and these steps are connected by means of step chains so as to cause them to perform circulation motion in and along the conveying path. During the circulation motion, the steps change their moving direction, or perform reversing motion, within a vertical plane at the turning section of the conveying path, move along the inclined plane in the forwarding way, and further move horizontally in a section between the end part of the forwarding way and the turning section. On the other hand, a step shaft provided on each step in its breadthwise direction constantly maintains its horizontal posture during the circulation motion of the step, on account of which, when the step chain connecting the step shaft is not engaged with the step shaft in a manner to be deflectable in any direction with respect to the step shaft, there occurs such an inconvenience that the steps could not perform smooth circulation motion.

SUMMARY OF THE INVENTION

It is therefore an object of the present invention to provide a curvilinear escalator which has solved the above-mentioned disadvantage inherent in the known art by connecting each step with the step chain through a spherical joint, thereby securing smooth circulation motion of the steps.

It is another object of the present invention to provide a novel curvilinear escalator in which a link member can be deflected in any direction with respect to a step shaft.

According to the present ivnention, in general aspect of it, there is provided a curvilinear escalator which comprises, in combination: a main frame having a substantially arcuate shape in the horizontal plane of projection and disposed in inclination, the main frame having a forwarding way formed on the top surface side thereof, a turning section at one distal end part of the main frame in the longitudinal direction thereof, and a return way on the bottom surface side thereof to thereby construct an endless conveying path; a plurality of steps continuously disposed in the conveying path and guided therealong, each of the steps being in a sector shape in a plane view; a pair of step chains disposed at both sides of the steps on the edge part in the breadthwise direction thereof and provided along the conveying path, the each step chain being constructed with joint pieces, each of which is engaged with the end part of a step shaft disposed in each of the steps in the breadthwise direction thereof, and link members with one end part thereof being connected with one end part of the joint piece and to bring the adjacent joint pieces into mutually connected state; and a spherical joint interposed between the step shaft and the link member.

BRIEF DESCRIPTION OF THE DRAWINGS

The foregoing objects, other objects as well as specific construction and function of the curvilinear escalator according to the present invention will become more apparent and understandable from the following detailed description thereof, especially when read in conjunction with the accompanying drawing illustrating preferred embodiments thereof.

In the accompanying drawing.

DESCRIPTION OF THE PREFERRED EMBODIMENTS

In the following, the present invention will be described in detail with reference to one preferred embodiment of the present invention shown in FIGS. 1 through 5.

Figure 1:
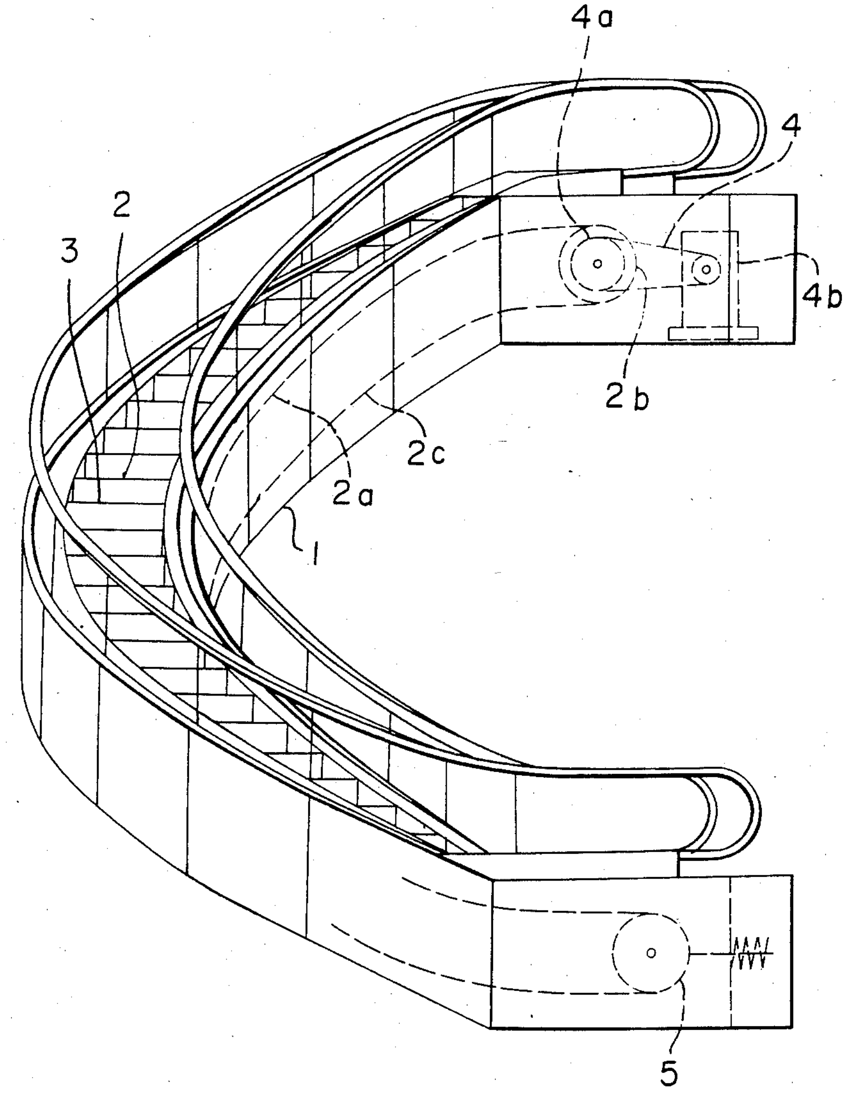
FIG. 1 is a front view showing one embodiment of the curvilinear escalator according to the present invention.
Figure 2:
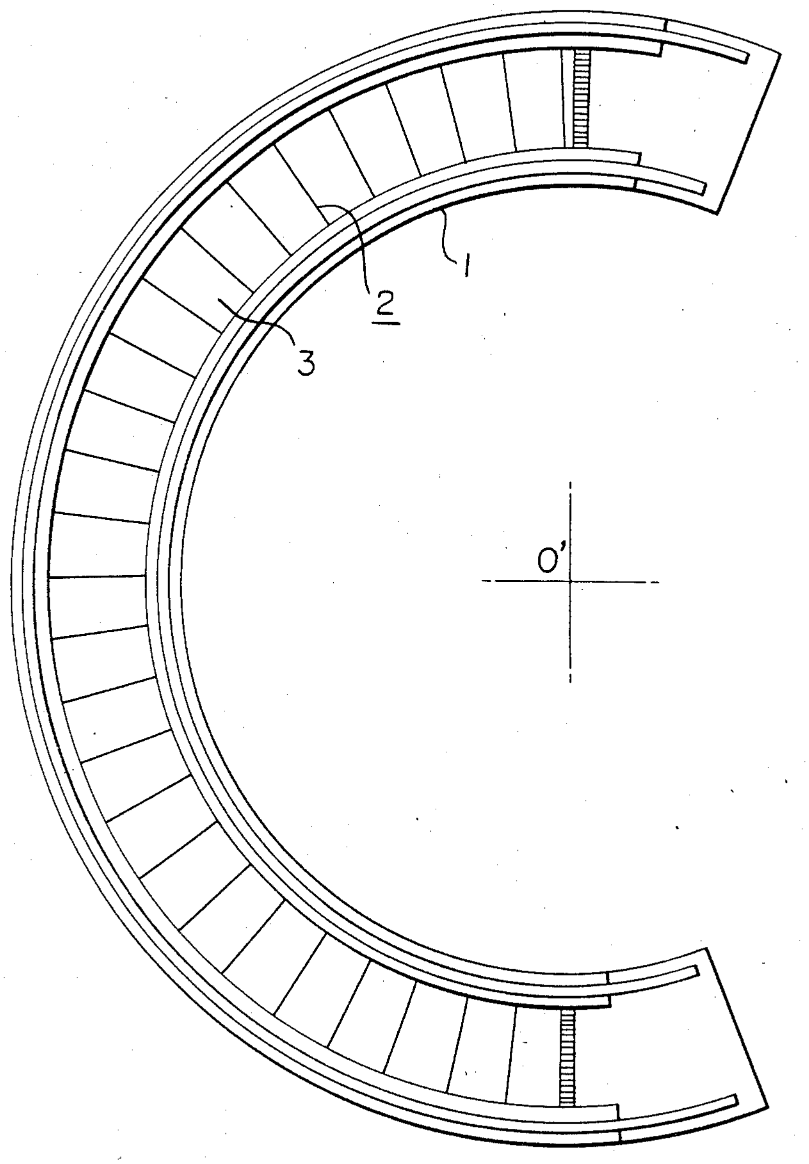
FIG. 2 is a top plane view of the curvilinear escalator shown in FIG. 1.
Figure 3:
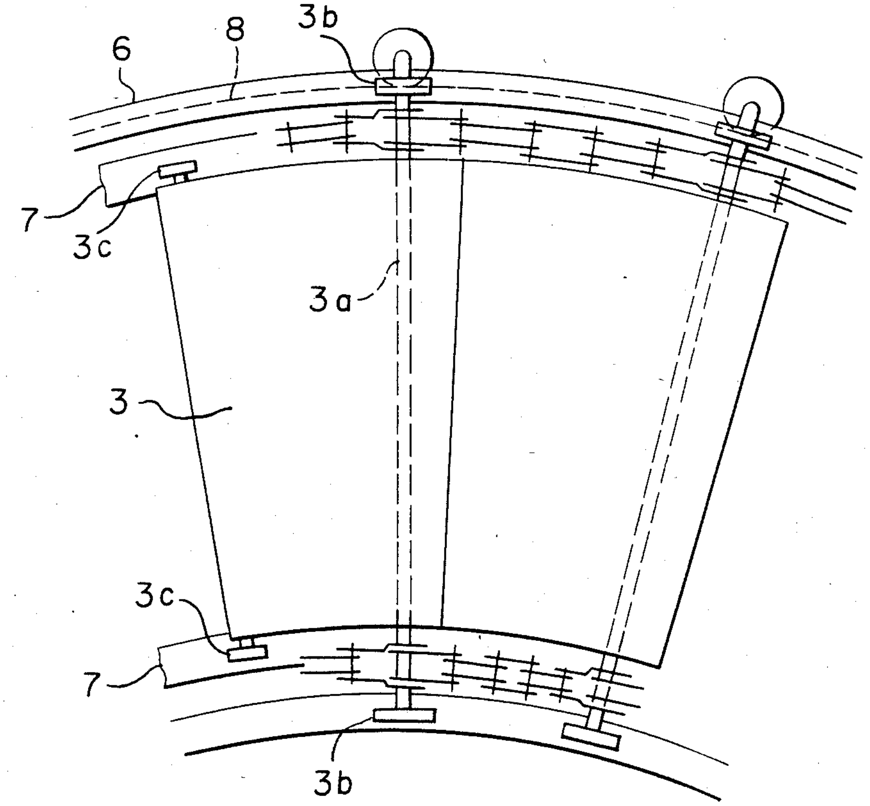
FIG. 3 is a partially enlarged plane view conceptionally showing the arrangement of the steps, step chains, and other structural components.

In FIGS. 1 and 2, a reference numeral 1 designates a main frame of the curvilinear escalator. The main frame is in a substantially arcuate form in the horizontal plane of projection, and is disposed in inclination. A numeral 2 refers to a conveying path having a step chain defined in the main frame 1. A forwarding way **2*a* is disposed on the top surface side of the main frame 1, a turning section 2*b* is provided at one end part of the main frame 1, and a return way 2*c* is arranged on the bottom surface side of the main frame 1, thereby constructing an endless conveying path. A reference numeral 3 represents a multitude of steps, each being in a sector form in a plane view, which are continuously disposed in and along the conveying path 2. A reference numeral 4 designates a driving device provided on the upper end part of the main frame 1; 4*a* represents a chain sprocket wheel of the driving device 4 to be driven by a drive power source 4*b*, around which the upper turning section 2*b* of the conveying path 2 having the step chain is engaged. A numeral 5 refers to a tension pulley to impart tensile force to the step chain, which is provided at the lower end part of the main frame 1, and around which the lower turning section 2*b* of the conveying path 2 having the step chain is engaged. In FIG. 3, a numeral 3*a*** refers to a step shaft provided on each step 3 in the breadthwise direction thereof; 3*b* designates front wheels pivotally supported on both end parts of the step shaft 3*a;* and 3*c* represents rear wheels pivotally supported on both edge part of the step 3. A numeral 6 refers to front wheel rails which are fixed on the main frame 1 and disposed along the conveying path 2 to guide the front wheels 3*b* on and along them. A reference numeral 7 indicates rear wheel rails which are also fixed on the main frame 1 and disposed along the conveying path 2 to guide the rear wheels 3*c* on and along them. A reference numeral 3 indicates a guide rail which is fixedly provided on the main frame 1 and disposed along the outer side of the arcuate conveying path 2.

Figure 4:
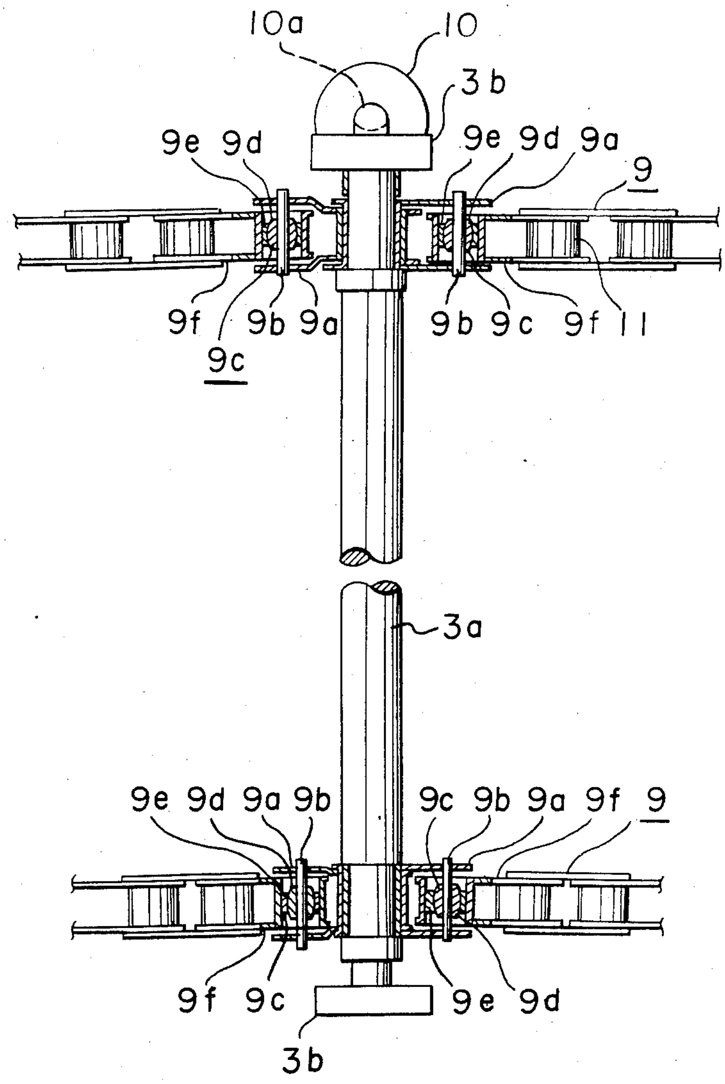
FIG. 4 is an enlarged plane view showing the details of the step shaft and the step chains shown in FIG. 3.

In FIG. 4, a numeral 9 refers to step chains which are disposed along the conveying path 2 and are correspondingly provided at both end parts of the step shafts 3*a;* 9*a* represents joint pieces for the step chains 9, each being pivotally held at the end part of the step shaft 3*a* and maintained at a predetermined position in the longitudinal direction of the step chain; 9*b* designates pins, each being provided at both end parts of the joint piece 9*a;* 9*c* refers to spherical joints, each being fitted on the pin 9*b* and constructed with a first bushing 9*d* with the outer surface thereof being formed in convex shape and a second bushing 9*e* with the inner surface thereof being formed in a concave shape and fitted on the convex outer surface of the first bushing 9*d;* 9*f* denotes link members for the step chains 9, the end part of each of which is connected with the joint piece 9*a* through its fitting with the spherical joint 9*c* to bring the mutually adjacent joint pieces 9*a* into mutual connection. A reference numeral 10 designates a guide roller which is pivotally held on an uprightly studded shaft 10*a* at the end part of the step shaft 3*a* and at the outer side of the arcuate conveying path 2.

The operation of the curvilinear escalator of the prsent invention will be described.

Figure 5:
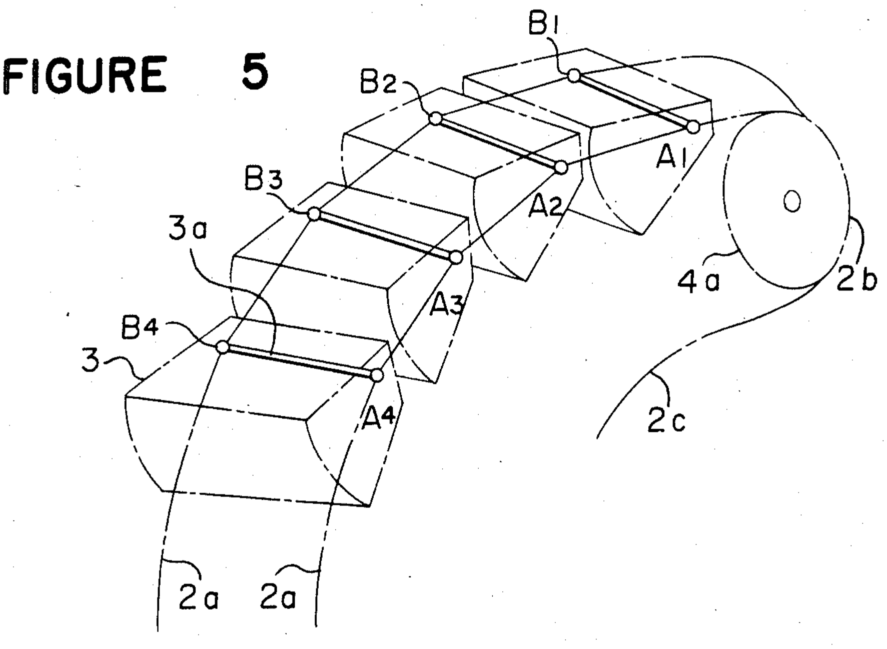
FIG. 5 is a perspective view schematically showing the movement of the steps in the curvilinear escalator shown in FIG. 1.

When the driving device 4 as in FIG. 1 is energized, the chain sprocket wheel 4*a* rotates and the steps 3 are driven through the step chains 9. During the driving, the front wheels 3*b* of the step 3 are guided to roll on and along the front wheel rails 6, the rear wheels 3*c* are guided to roll on and along the rear wheel rails 7, and the guide roller 10 is guided to roll on and along the guide rail 8 as shown in FIG. 3, whereby the steps 3 perform their circulation motion in and along the conveying path 2. And, during the movement of the steps 3, there is formed a twisted, curved plane between the mutually adjacent step shafts 3*a,* because, on the forwarding way 2*a* of the conveying path 2, the step chain 9 which connects each and every step shaft 3*a* is longer at the outer side of the arcuate conveying path 2 than at the inner side thereof, and, moreover, each and every step shaft 3*a* moves in constantly keeping its horizontal posture. More specifically, as shown in FIG. 5, horizontal portions Al, A2, Bl and B2 are formed to the side of the turning section 2*b* on the forwarding way 2*a* with the consequence that a flat plane is formed between the mutually adjacent step shafts 3*a.* On the other hand, inclined portions A2, A3, B2 and B3, or inclined portions A3, A4, B3 and B4 are formed to the side of the intermediate section on the forwarding way 2*a* with the consequent formation of twisted curves between the mutually adjacent step shafts 3*a.* As the consequence of this, there accompanies twisting of the step chains 9 between the mutually adjacent step shaft 3*a.* Since, however, as shown in FIG. 4, the link member 9*f* is connected with the joint piece 9*a* through the spherical joint 9*c,* the link member 9*f* is able to assume a state of being deflected in any direction with respect to the joint piece 9*a,* i.e., the step shaft 3*a,* whereby it becomes possible to move the steps 3 smoothly along the conveying path 2.

Incidentally, a tensile force of from 1,600 to 2,000 $kg/mm^2$ acts on the step chains 9 at the maximum load imposed on the curvilinear escalator. However, by the provision of the spherical joint 9*c,* the surface pressure between the first bushing 9*d* and the second bushing 9*e* can be reduced to several kilograms per square millimeter, thereby making it possible to obtain the step chains 9 having a prolonged service life. In addition, the spherical joint 9*c* is provided on the pin 9*b* to be constructed as an integral part of the connection of the link member 9*f,* which makes it possible to reduce the size of the device without necessity for any additional space for the joint to secure its free deflection. It is further possible to effect transmission of the driving power by constructing the outer surface of the spherical joint 9*c* in the same size as rollers 11 disposed in the link member 9*f,* and engaging the position of the spherical joint 9*c* with the chain sprocket wheel 4*a.* In this manner, meshing of the step chains 9 with the chain sprocket wheel 4*a* can be done smoothly, and irregularities in the chain rotation can be reduced thereby, which contributes to reduction in vibrations and noises to be generated from such irregularities. Also, manufacture of the chain sprocket wheel 4*a* and other component parts becomes easy.

Figure 6:
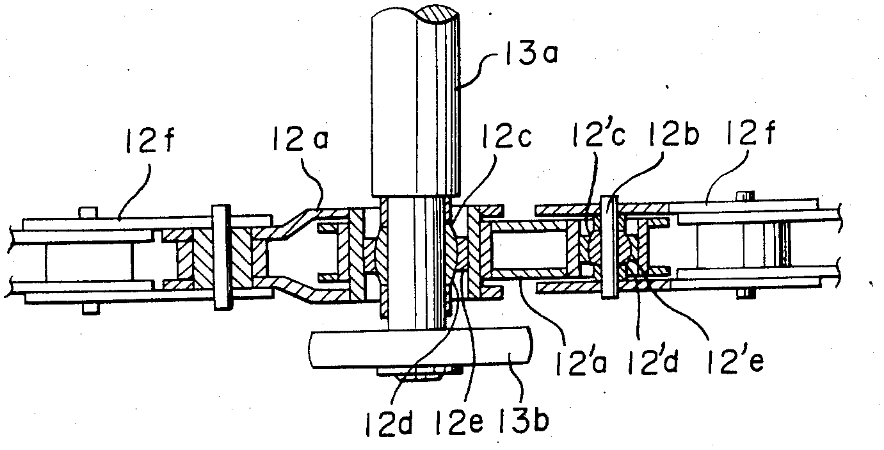
FIG. 6 is an enlarged plane view, corresponding to FIG. 4, showing the details of another embodiment of the step shaft and the step chain for the curvilinear escalator according to the present invention.

FIG. 6 illustrates another embodiment of the step chain for the curvilinear escalator according to the present invention. In the drawing, a reference numeral 12*a* designates the first joint piece which is connected with the step shaft 13*a* through the first spherical joint 12*c;* a numeral 12'*a* designates the second joint piece, one end of which is connected with the step shaft 13*a* through the outer bushing of the first spherical joint 12*c* and the other end of which has the second spherical joint 12'*c* provided on it; and 12*f* refers to the link member which links the adjacent step shafts 13*a* together by being connected with the second spherical joint 12'*c* of the first joint piece 12*a* or the second joint piece 12'*c.* The first spherical joint 12*c* comprises a first bushing 12*d* and a second bushing 12*e* and the second spherical joint 12'*c* comprises a first bushing 12'*d* and a second bushing 12'*e.* A numeral 12*b* designates a pin. In the construction as above-mentioned, the step shaft 3*a* is connected with the link member 12*f* of the step chain 12 by means of the first spherical joint 12*c* and the second spherical joint 12'*c* through either the first joint piece 12*a* or the second joint piece 12'*a.* On account of such construction, the link member 12*f* is able to be deflected in any direction with respect to the step shaft 13*a.* It is therefore apparent that, in this embodiment too, the same function as in the embodiment of FIGS. 1 through 5 can be obtained.

As has been explained in the foregoing, the curvilinear escalator according to the present invention constructs the step chains to connect the steps, each having a sector shape in plane, with the joint pieces provided on the step shaft and the link member which links mutually adjacent joint pieces, and further the spherical joint is provided at the connection between the step shaft and the joint piece, or at the connection between the joint piece and the link member, or at both connections, whereby the link member is able to assume a state of being able to deflect in any direction with respect to the step shaft in relation to the movement of the steps which inevitably causes twisting in the step chains, and whereby the curvilinear escalator capable of moving the steps smoothly along the conveying path can be realized.

Although, in the foregoing, the present invention has been described with reference to particular embodiments thereof, it will be understood by those persons skilled in the art that the invention is not limited to these embodiments alone, but is capable of a variety of alternative embodiments within the spirit and scope of the invention as recited in the appended claim.

I claim:

1. A curvilinear escalator which comprises:

(a) a main frame having a substantially arcuate shape in the horizontal plane of projection and disposed in an inclined condition, said main frame having a forwarding way formed on the top surface side thereof, a turning section at each distal end part of the main frame in the longitudinal direction thereof, and a return way on the bottom surface side thereof to thereby construct an endless conveying path confined to said arcuate shape;

(b) a plurality of steps continuously disposed in said conveying path and guided therealong, each is said steps being in a sector shape in plan view, each of said steps having a step shaft disposed in the breadthwise direction;

(c) a pair of step chains disposed at both sides of said steps on the edge part in the breadthwise direction thereof and provided along said conveying path and being driven by a sprocket wheel, each step chain being constructed of joint pieces and link member, said joint pieces being engaged with an end part of said step shaft, said link members having one end part connected with one end part of one of said joint pieces, so as to connect said adjacent joint pieces, said link members including rollers;

(d) a spherical joint including a pin, a first bushing having a curved exterior surface and mounted on said pin, a second bushing having an interior surface matching the exterior surface of said first bushing and an exterior cylindrical surface; said cylindrical surface having the same configuration as said rollers and having the same pitch as said rollers so as to be engageable by said sprocket wheel in the same manner as said rollers; whereby said interior surface of said second bushing and said exterior surface of said first bushing form a sliding surface of said joint;

(e) said spherical joint being placed at the connection between said joint piece and said link member so as to allow said link members to be disposed at an angle to said joint members, thus reducing the force exerted on said step chains.

2. A curvilinear escalator which comprises:

(a) a main frame having a substantially arcuate shape in the horizontal plane of projection and disposed in an inclined condition, said main frame having a forwarding way formed on the top surface side thereof, a turning section at each distal end part of the main frame in the longitudinal direction thereof, and a return way on the bottom surface side thereof to thereby construct an endless conveying path confined to said arcuate shape;

(b) a plurality of steps continuously disposed in said conveying path and guided therealong, each of said steps being in a sector shape in plan view, each of said steps having a step shaft disposed in the breadthwise direction;

(c) a pair of step chains disposed at both sides of said steps on the edge part in the breadthwise direction thereof and provided along said conveying path and being driven by a sprocket wheel, each step chain being constructed of joint pieces and link members, said joint pieces being engaged with an end part connected with one end part connected with one end part of said step shaft, said link members having one end part connected with one end part of one of said joint pieces, so as to connect said adjacent joint pieces, said link members including rollers;

(d) a first spherical joint including a first bushing having a curved exterior surface and mounted on said step shaft, a second bushing having an interior surface matching the exterior surface of said first bushing and an exterior cylindrical surface which is engageable by said sprocket wheel; whereby said interior surface of said second bushing and said exterior surface of said first bushing form a sliding surface of said first joint;

(e) a second spherical joint including a pin, a first bushing having a curved exterior surface and mounted on said pin, a second bushing having an interior surface matching the exterior surface of said first bushing and an exterior cylindrical surface; said cylindrical surface having the same configuration as said rollers and having the same pitch as said rollers so as to be engageable by said sprocket wheels in the same manner as said rollers whereby said interior surface of said second bushing and said exterior surface of said first bushing form a sliding surface of said second joint;

(f) said first spherical joint being placed at the connection between said joint piece and said step shaft, said second spherical joint being placed between said joint piece and said link members so as to allow said link members to be disposed at an angle to said joint members, thus reducing the force exerted on said step chains.

* * * * *